United States Patent [19]

Zafiroglu

[11] Patent Number: 5,288,536
[45] Date of Patent: Feb. 22, 1994

[54] HYDRAULIC-JET-TREATED STITCHBONDED FABRIC

[75] Inventor: Dimitri P. Zafiroglu, Wilmington, Del.

[73] Assignee: E. I. Du Pont de Nemours and Company, Wilmington, Del.

[21] Appl. No.: 68,821

[22] Filed: May 28, 1993

[51] Int. Cl.$^5$ ............................................... B32B 3/06
[52] U.S. Cl. ...................................... 428/102; 28/104; 28/105; 428/137; 428/138; 428/224; 428/299
[58] Field of Search ................... 28/104, 105; 428/102, 428/137, 138, 139, 224, 299

[56] References Cited

U.S. PATENT DOCUMENTS

| | | | |
|---|---|---|---|
| 4,704,321 | 11/1987 | Zafiroglu | 428/230 |
| 4,773,238 | 9/1988 | Zafiroglu | 66/192 |
| 4,863,776 | 9/1989 | Sternlieb | 428/102 |
| 4,876,128 | 10/1989 | Zafiroglu | 428/102 |
| 5,023,130 | 1/1991 | Simpson et al. | 428/227 |

Primary Examiner—James J. Bell

[57] ABSTRACT

Stitchbonded fabrics are treated with columnar jets of water under specific conditions to rearrange fibers within the fabric so that holes caused by the stitches of the stitchbonding are substantially filled and the fabrics are made suitable for filter fabrics. The process requires at least the last part of the treatment to be performed on fine mesh screens with fine jets. The resultant fabrics are particularly suited for use as filter fabrics.

7 Claims, No Drawings

HYDRAULIC-JET-TREATED STITCHBONDED FABRIC

BACKGROUND OF THE INVENTION

1. Field of the Invention

The present invention relates to a process for treating stitchbonded fabrics and the product made thereby. More particularly, the invention concerns subjecting a stitchbonded fabric to impact-energy from fine hydraulic jets. The treatment renders the stitchbonded fabric particularly suitable for filter fabric, protective clothing and the like.

2. Description of the Prior Art

Stitchbonded fabrics and processes for their manufacture are known. To produce such fabrics, a fibrous layer is multi-needle stitched with one or more thread systems. The fibrous layer typically is composed of substantially non-bonded fibers of no greater than textile decitex. Many types of threads or yarns have been used in the thread systems, including non-elastic yarns, elastic yarns, combination yarns, covered yarns and the like. The fabrics have found many uses, the characteristic holes made by the needles and threads during manufacture of the fabrics, limit the utility of the stitchbonded fabrics. For example, the fabrics usually are unsuited for filter fabrics, protective clothing or the like. Even when the stitchbonded fabric is contracted significantly in planar area, undesirable effects of the holes still persist.

It is a purpose of the present invention to provide a process whereby the effects of stitching holes in a stitchbonded fabric can be reduced substantially so that the fabric can be employed in uses heretofore unsuited for stitchbonded fabrics.

SUMMARY OF THE INVENTION

The present invention provides a process wherein a stitchbonded fabric comprising a multi-needle stitched fibrous layer of substantially nonbonded fibers is subjected to a treatment wherein the stitchbonded fabric, while supported on a screen, is impacted by columnar jets of water which impart a total impact-energy of at least 0.3 MJN/Kg to the fabric. The stitchbonded fabric typically has an initial compressed thickness (as defined hereinafter) in the range of 0.15 to 0.85 mm and a unit weight in the range of 50 to 350 grams per square meter. At least 0.02 MJN/Kg of the total impact-energy is imparted in a final part of the treatment by fine jets supplied through orifices of no greater than 0.15-mm diameter and spaced with a frequency of at least 10/cm across the fabric while the fabric is supported on a fine-mesh screen of no coarser than 40 mesh, preferably in the range of 100 to 200 mesh. The screen in the first part of the treatment has a thickness that is at least as thick as the initial compressed thickness of the stitchbonded fabric. Preferably, the total impact-energy is no greater than 1.2 MJN/Kg. When the stitchbonded fabric is thin and of light weight, a total impact-energy is no more than 0.1 MJN/Kg. As a result of the treatment, the undesirable effects of the holes that were formed by the multi-needle stitching during the manufacture of the stitchbonded fabric are much diminished.

DETAILED DESCRIPTION OF PREFERRED EMBODIMENTS

The invention is further illustrated by the following description of preferred embodiments. These are included for the purposes of illustration and are not intended to limit the scope of the invention, which is defined by the appended claims.

Stitchbonded fabrics suitable for treatment in accordance with the process of the present invention are made by known techniques. Such stitchbonded fabrics are disclosed, for example in Zafiroglu, U.S. Pat. Nos. 4,704,321, 4,773,238 and 4,876,128. The stitchbonded fabrics typically have a fibrous layer of substantially nonbonded fibers. As used herein, the term "substantially nonbonded" means that the fibers of the layer generally are not bonded to each other, as for example by chemical, adhesive or thermal means. However, a small amount of overall bonding or point bonding is intended to be included in the term "substantially nonbonded". As long as the bonding is insufficient to prevent the fibers of the fibrous layer from being rearranged by the treatment of the invention sufficiently to fill multi-needle stitching holes in the fabric, the layer is considered to be substantially nonbonded. The term "fiber", as used herein, includes staple fibers, continuous filaments, plexifilamentary strands and the like. Fibers of no greater than textile decitex (i.e., no greater than about 10 decitex) are preferred.

The stitching threads of the stitchbonded fabrics typically are conventional flat (i.e., non-elastic) yarns, elastic yarns, textured yarns, combined yarns and the like. The stitching threads can constitute as much as half of the total weight of the stitchbonded fabric. Typically the stitching amounts to between 15 and 45% of the total weight of the stitchbonded fabric. For use in the process of the present invention, the stitchbonded fabric preferably has an initial compressed thickness (measured as described hereinafter) in the range of 0.15 to 0.85 mm and a unit weight in the range of 50 to 350 grams per square meter.

In accordance with the process of the present invention, the total impact-energy imparted to the stitchbonded fabric must be at least 0.03 MJN/Kg. The total impact-energy preferably is no greater than 1.3 MJN/Kg. For economy, the total impact-energies nearer to the lower limit are preferred. However, in any treatment according to the invention, at least 0.02 MJN/Kg of the total impact-energy is imparted to the stitchbonded fabric in the last part of the treatment. The final part of the treatment is performed with fine jets while the fabric is supported on a screen of at least 40 mesh, preferably of 100 to 200 mesh. Typically, the fine jets are supplied from a row of orifices of no greater than 0.15-mm diameter, spaced at a frequency of at least 10/cm, preferably at least 15/cm. The row of orifices is positioned perpendicular to the direction of movement of the fabric during the treatment and usually stretches across the entire width of the fabric.

In accordance with the hydraulic jet treatment of the invention, during the first part of the treatment, the stitchbonded fabric is supported on a screen that has a thickness that is at least equal to the initial compressed thickness of the fabric. Preferably the screen thickness is in the range of 1.5 to 10 times the initial compressed thickness of the stitchbonded fabric.

The supporting screens can vary considerably in open area. Screens of 15 to 35% open area are usable, but screens having an open area in the range of about 18 to 25% are preferred. The thickness and open area of the screen combine to form multiple small regions wherein the fibers of the fabric can be rearranged when acted upon by hydraulic jets in accordance with the present invention. Typically, screens suitable for use in the treatment have a depth (i.e., thickness) that is about equal to the distance between successive wires of the screen. Plain weave screens are preferred.

When the stitchbonded fabric being treated is thin and of light weight, for example having an initial compressed thickness of no greater than 0.7 mm and a unit weight of no more than 150 g/m², a total impact-energy of no more than 0.1 MJN/Kg is preferred. Most preferably, for thin, lightweight stitchbonded fabrics of no greater than 0.25 mm initial compressed thickness and no heavier than 100 g/m², the entire treatment is performed with the stitchbonded fabric supported on a screen of 100 to 200 mesh.

The impact-energy, IxE, imparted to a stitchbonded fabric by the jets of water during the hydraulic jet treatment of the fabric is calculated in the known manner as indicated by the formulas set forth below. The various parameters appearing in the formulas are listed in the "English" units in which the parameters were originally measured or from units derived from those measurements (e.g., pounds per square inch pressure converted to pounds per square foot) so that the impact-energy is in foot-pounds punds(force) per pound (mass), which when multiplied by 26.3, is converted to MegaJoule-Newtons per kilogram (MJN/Kg). The formulas read:

$$I = PA,$$

$$E = PQ/wzs, \text{ and then}$$

$$IxE = P^2 AQ/wsz,$$

wherein
I is impact in pounds (force),
E is jet energy in foot pounds (force) per pound (mass),
P is water pressure immediately upstream of the orifice in pounds force per square foot,
A is the cross-sectional area of the jet in square feet,
Q is the flow of water in cubic feet per minute,
w is fabric weight in pounds (mass) per square yard,
z is fabric width in yards and
s is the speed of the fabric through the jets in yards per minute.

TEST PROCEDURES

The following methods were used to measure the several parameters and characteristics reported herein for the process of the invention and products made thereby, and for comparison processes and products. The following methods were used to measure the parameters and characteristics.

The unit weight of a fabric or fibrous layer was measured according to ASTM Method D3776-79, using samples measuring 6 in by 6 in (15.2 cm×15.2 cm). Fabric bulk in cm³/g was determined from the thickness and the unit weight of the fabric. The thickness of the fabrics, which was the thickness used for the calculation of fabric bulk, was measured with a Starrett gauge, Model 25-631. The gauge applies a light load of 10 grams to a cylindrical foot of 1-in (2.54-cm) diameter, which is equivalent to a pressure of 0.03 psi (0.21 kPa) on the surface of the fabric during the measurement.

The initial compressed thickness of a stitchbonded fabric sample prior to hydraulic treatment was measured with an Ames Comparator (Model 24) having a cylindrical foot of 0.5-in (1.27-cm) diameter loaded with 90 grams. The comparator applies a pressure of approximately 1 psi (6.89 kPa) to the fabric. The initial compressed thickness is used in the calculation of the ratio of the thickness of the supporting screen to the thickness of the fabric being treated during the initial part of the hydraulic jet treatment. The thickness of the screen was measured with a micrometer.

Frazier air permeability was determined according to ASTM Method D737-75.

Filtration performance was evaluated by passing air laden with Fine Air Cleaner Dust (Batch No. 4401, General Motors A. C. Spark Plug Div.) through a test fabric sample measuring 6 in×8 in (15.2 cm×20.3 cm) for a total of 180 hours or until an "absolute" filter (100% efficient) placed downstream of the fabric sample became blocked. The "absolute" filter was considered blocked when when the pressure drop across the absolute filter increased to 3 inches (7.6 cm) of water. Air was passed through the test fabric by a Spencer Turbo compressor having a capacity of 100 standard cubic feet per minute (2.83 cubic meters/min) at 50 inches (127 cm) of water at room temperature. For the tests, a flow of about 10 scfm (0.283 m³/m;in) was maintained through the test sample. Dust was added to the air stream at a rate of 2 g/min. The dust was collected on the test fabric sample and in a removable canister in the bottom of the sample chamber. Dust which leaked through the test fabric sample was trapped by the "absolute" filter, so that the weight of the "absolute" filter before and after each run gave a direct measure of the leakage. Filtration performance was measured by (a) the time (hours) until the "absolute" filter became blocked and (b) the amount of dust leakage through the test fabric sample in grams/day, calculated over the duration of the test.

The water repellency of the fabrics was measured according to AATCC 127 and reported as the hydrohead in centimeters inches of water.

Water vapor permeability was measured according to TAPPI T448 OM 84 and reported in g/m²/day.

EXAMPLES

In the following examples, stitchbonded fabrics of various types are subjected to hydraulic jet treatments in accordance with the process of the invention and for comparison purposes, to treatments that are outside the invention. The examples demonstrate the advantageous effects of the process of the invention in ameliorating the undesired effects of holes that were created in stitchbonded fabrics by the multi-needle stitching process needed to manufacture the fabrics. The treatments in accordance with the invention are designated with Arabic numerals; the comparison treatments, with upper case letters.

In the examples, three different sizes of screens were used to support the stitchbonded fabrics during the hydraulic jet treatments; namely, S-1, a 100-mesh (i.e., 100 wires per inch) plain-weave metal screen having a 21% open area, a thickness of 0.012 inch (0.3 mm), and wire-to-wire spacing of 0.010 inch (0.25 mm);

S-2, a 24-mesh (i.e. 24 wires per inch) plain-weave metal screen having a 20% open area, a thickness of 0.048 inch (1.2 mm), and a wire-to-wire spacing of 0.042 inch (1.1 mm); and S-3, a 10-mesh (i.e., 10 wires per inch) plain-weave metal screen having a 20% open area, a thickness of 0.085 inch (2.2 mm), and a wire-to-wire spacing of 0.100 inch (2.5 mm).

The hydraulic entanglement equipment used to treat the stitchbonded nonwoven fabrics in each example was substantially of the type by Summers, U.S. Pat. No. 3,537,945, column 4, lines 4–45 and FIG. 1. The hydraulic jet treatment of the stitchbonded fabrics was performed by passing the fabrics at 10 yd/min (9.1 m/min) under a row of evenly spaced jets, located perpendicular to the direction of movement of the screen and about 1 in (2.54 cm) above its surface. In each example, unless indicated otherwise, the stitchbonded fabric was subjected to the hydraulic jet treatment in two steps.

EXAMPLE I

In this example stitchbonded fabrics suitable for use in reusable protective clothing were prepared (Samples 1 and 2) by a hydraulic jet treatment in accordance with the present invention. Comparison Sample A was prepared using a total impact energy that is below the minimum required to sufficiently close the stitching holes. Comparison Sample B was prepared using jets that were too large in the final hydraulic treatment step. As a result, in contrast to Samples 1 and 2, prepared by the process of the invention, the fabric properties of comparison Samples A and B were markedly inferior in their ability to filter particles and prevent vapors (as measured by Frazier permeability) and liquids (as measured by hydrohead) from passing through the fabric.

The starting stitchbonded fabric for each sample of this example was obtained by multi-needle stitching a 1.5-oz/yd$^2$ (50.9-g/m$^2$) spunbonded polyethylene plexifilamentary sheet (Type-800 "Tyvek" made and sold by E. I. du Pont de Nemours and Company, Wilmington, DE) with 1-0,0-1 chain stitches using 70-denier (78-dtex) 34-end textured nylon at 12 stitches per inch (4.7/cm) on a single-bar "Liba" stitchbonding machine with the bar threaded at 12 gauge (4.8 needles/cm). The stitching yarn amounted to about 18% of the weight of the stitchbonded fabric. The fabric had an initial compressed thickness of 0.007 in (0.18 mm).

In the first part of its hydraulic jet treatment, the stitchbonded fabric of Sample 1 was supported on Screen S-1 (100 mesh) and exposed to an impact-energy of 0.04 MJN/Kg by being passed under a row of columnar jets of water, spaced 40/in (15.7/cm), positioned perpendicular to the direction of movement of the stitchbonded fabric, and emerging from orifices of 0.005-in (0.127-mm) diameter, supplied with water at 1000 psi (6,890 KPa). In the second and final step of the treatment, the stitchbonded fabric was subjected, while being supported on the same screen as in the first step, to an impact-energy of 0.035 MJN/kg imparted by a row of jets emerging from orifices of 0.004-in (0.10-mm) diameter, spaced at 80/inch (31.5/cm) and supplied with water at 1000 psi (6.890 KPa).

Sample 2 was prepared in a similar manner to Sample 1, except that Screen S-2 (24 mesh) was used in the first treatment step.

Comparison Sample A was prepared by subjecting the stitchbonded fabric to an impact-energy of 0.013 MJN/kg in the first hydraulic treatment step, while being supported on Screen S-2 (24 mesh). In the first step, the impact-energy was imparted by a row of jets emerging from 0.005-in (0.13-mm) diameter orifices, spaced at 40/in (15.7/cm) and supplied with water at 500 psi (3,450 KPa). In the second treatment step, the fabric was exposed to an impact-energy of 0.011 MJN/kg, while being supported on Screen S-1. In the second treatment, the jets were supplied with water at 500 psi (3,450 KPa) through a row of orifices of 0.004-in (0.10-mm) diameter spaced at 80/in (31.5/cm) in the row.

Comparison Sample B was prepared by subjecting the starting stitchbonded fabric to an impact-energy of 0.040 MJ-N/kg in a first step that was identical to that used for Sample 2, and to an impact energy of 0.040 MJN/kg in a second step using Screen S-1 (100 mesh) and hydraulic jets emerging from orifices of 0.010-in (0..25mm) diameter and spaced at 10/in (4/cm) and supplied 1000 psi (6890 KPa).

Table I, below, summarizes details of the hydraulic treatment conditions and resulting fabric properties. Note that the stitching holes in Samples 1 and 2 were found to be substantially filled by fibers (when viewed under low magnification). In contrast, the holes were substantially open and unfilled in Comparison Sample A (which had been prepared with insufficient impact-energy) and Comparison Sample B (which had been treated with excessively large jets in the final hydraulic treatment step) was nonuniform fiber coverage and had jet tracks in the treated fabric.

Samples 1 and 2 are especially suitable for use in reusable protective clothing. In addition to their superior fluid barrier properties (hydrohead) while maintaining a high comfort level (i.e. high water vapor permeability) these samples also are wash-durable.

TABLE I

| Example I A. Hydraulic Jet Treatment | | | | |
|---|---|---|---|---|
| Sample | 1 | 2 | A | B |
| Step 1 | | | | |
| Screen mesh | 100 | 24 | 24 | 24 |
| Thickness ratio* | 1.7 | 6.7 | 6.7 | 6.7 |
| IxE, MJN/Kg | 0.040 | 0.040 | 0.013 | 0.040 |
| Step 2 | | | | |
| Screen mesh | 100 | 100 | 100 | 100 |
| IxE, MJN/Kg | 0.035 | 0.035 | 0.011 | 0.040 |
| Total IxE, MJN/Kg | 0.075 | 0.075 | 0.024 | 0.080 |

| B. Fabric Properties | | | | | |
|---|---|---|---|---|---|
| Sample | Initial+ | 1 | 2 | A | B |
| Thickness, mm | 0.36 | 0.61 | 0.71 | 0.58 | 0.69 |
| Weight, g/m$^2$ | 75 | 75 | 75 | 75 | 75 |
| Bulk, cm3/g | 4.8 | 8.1 | 9.5 | 7.7 | 9.2 |
| Frazier, m$^3$/min | 1.07 | 0.42 | 0.50 | 0.71 | 0.95 |
| Filtration | | | | | |
| (a) Hrs to clog | 42 | >180 | >180 | 51 | 30 |
| (b) Leakage, g/day | 2.2 | 0.03 | 0.02 | 1.2 | 1.8 |
| Hydrohead, cm H$_2$O | 3.0 | 27.2 | 37.1 | 5.3 | 17.8 |
| Vapor Permeability, g/day/m$^2$ | 543 | 606 | 612 | 670 | 567 |

+starting properties of stitchbonded fabric
*ratio of screen thickness to initial compressed thickness of the stitchbonded fabric being treated (all samples of this example used a 75 g/m$^2$-stitchbonded fabric of 0.18-mm initial compressed thickness)

EXAMPLE II

In this example, fabrics suitable for use in high-strength, reusable dust and particle filters, Samples 3 and 4, were prepared in accordance with the invention. Comparison Sample C demonstrates that poor results are achieved when the screen used in the first hydraulic treatment step is too fine; that is when the ratio of the thickness of the screen to the initial compressed thickness of the starting stitchbonded fabric being treated is below the required minimum of at least 1.2.

The starting stitchbonded fabric for the samples of this example was produced by stitching the same plexifilamentary spunbonded polyethylene fibrous layer as was used in Example I with an elastic yarn making 1-0,2-3 tricot stitches at 14 stitches per inch (5.5/cm) on a "Liba" stitchbonding machine with a single bar threaded at 12 gauge (4.8 needles/cm). The elastic yarn was a 280 denier (1244 dtex) "Lycra" spandex wrapped with 70-denier (78-dtex) 34-filament textured polyester ("Lycra" is made and sold by E. I. du Pont de Nemours and Co.) Sufficient tension was placed on the stitching yarn during stitching to stretch it 4.8 times its original length to 58 denier (64 dtex) so that upon release of the tension, the fabric gathered to a weight of 3.6 oz/yd$^2$ (122 g/m$^2$). The stitchbonded fabric comprised approximately 37 wt % stitching yarn and had an initial compressed thickness of 0.024 in (0.61 mm).

Sample 3 was prepared by subjecting the stitchbonded fabric, in the first step of the treatment, while supported on Screen S-2 (24 mesh), to an impact-energy of 0.04 MJN/Kg, by passing the fabric under a row of columnar jets of water, spaced at 10/inch (4/cm), and emerging from orifices of 0.010-in (0.254-mm) diameter supplied with water at 1000 psi (6890 KPa). In the second step of the treatment, the stitchbonded fabric was supported on Screen S-1 (100 mesh) and subjected to an impact energy of 0.04 MJN/Kg, imparted by a row of jets emerging from 0.005-in (0.127-mm) diameter orifices, spaced at 40/in (15.7/cm) and supplied with water at 1000 psi (6890 KPa).

Sample 4 was prepared in a manner similar to Sample 3, except that Screen S-3 (10 mesh) was used in the first hydraulic treatment step.

Sample C was prepared in a manner similar to Sample 3, except that Screen S-1 (100 mesh) was used for supporting the starting stitchbonded fabric in both the first and second hydraulic treatment steps.

Table II, below, summarizes details of the hydraulic treatment conditions and properties of the resultant samples.

The stitching holes in Samples 3 and 4 were found to be substantially filled by fibers when viewed under low magnification, whereas the wholes still substantially open and unfilled in Comparison Sample C. The screen used in the first hydraulic treatment pass for Sample C was finer than the initial compressed thickness of the starting stitchbonding fabric; as a result, there apparently was insufficient rearrangement of the fibers to close the stitching holes. The filtration performance for Samples 3 and 4 was significantly better than that of the starting fabric or Comparison Sample C.

Samples 3 and 4 are also suitable for use in insulating reusable protective clothing. Both samples made by the process of the invention have good barrier properties while maintaining a high comfort level, as evidenced by the high hydrohead and water vapor permeability values.

TABLE II

| | Example II A. Jet Treatment | | |
|---|---|---|---|
| Sample | 3 | 4 | C |
| Step 1 | | | |
| Screen mesh | 24 | 10 | 100 |
| Thickness ratio* | 2 | 3.6 | 0.5 |
| IxE, MJN/Kg | 0.04 | 0.04 | 0.04 |
| Step 2 | | | |
| Screen mesh | 100 | 100 | 100 |
| IxE, MJN/Kg | 0.04 | 0.04 | 0.04 |
| Total IxE, MJN/Kg | 0.08 | 0.08 | 0.08 |
| | B. Fabric Properties | | |
| Sample | Initial+ | 3 | 4 | C |
| Thickness, mm | 0.94 | 1.19 | 1.14 | 0.94 |
| Bulk, cm$^3$/g | 7.7 | 9.7 | 9.3 | 7.7 |
| Frazier, m3/min | 0.97 | 0.52 | 0.45 | 0.88 |
| Filtration | | | | |
| (a) Hrs to clog | 110 | >180 | >180 | 81 |
| (b) Leakage, g/day | 0.78 | 0.09 | 0.01 | 0.52 |
| Hydrohead, cm H$_2$O | 7.6 | 20.8 | 23.6 | 9.4 |
| Vapor Permeability, g/day/m$^2$ | 586 | 615 | 507 | 508 |

+see table I
*see Table I, (all samples of Example II used a 122-g/m$^2$ stitchbonded fabric of 0.61-mm initial compressed thickness)

EXAMPLE III

This example demonstrates hydraulic jet treatment of a stitchbonded fabric comprising a thin spunlaced fabric stitched with non-elastic yarns. The initial fabric had unacceptable filtration properties, but a treatment in accordance with the invention converted the fabric into a fabrics (Samples 5 and 6) that were suitable for use in high-flow hot-gas filters. In this example, all samples were exposed to the same IxE in two treatment steps, but each with different support screens used in each step. Sample D demonstrates the importance of using a fine screen in the final hydraulic treatment step.

The starting stitchbonded fabric was obtained by stitching a 1-oz/yd$^2$ (34 g/m$^2$) layer of Type E-88 "Sontara" spunlaced fabric of "Nomex" aramid staple fiber (made and sold by E. I. du Pont de Nemours and Co.) with 200-denier (222-dtex), 100-filament Type 430 "Nomex" aramid yarn. A 1-0,1-2 tricot stitch pattern at 9 stitches per inch (3.5/cm) was inserted with a single bar "Liba" threaded at 6 gauge (2.4 needles/cm). A stitchbonded fabric comprised approximately 33 wt % stitching yarn was produced having a total weight of 54 g/m$^2$ and an initial compressed thickness of 0.006 in (0.15 mm).

Sample 5 was prepared by subjecting the stitchbonded fabric, in the first treatment step, while supported on Screen S-1 (100 mesh), to an impact-energy of 0.04 MJN/Kg by passing the layer under a row of columnar jets of water, spaced at 40/in (15.7/cm) and emerging from orifices of 0.005-in (0.13-mm) diameter supplied with water at 1000 psi (6890 KPa). In the second treatment step, the stitchbonded fabric was subjected to an impact-energy of 0.035 MJN/Kg using the same screen, jets supplied from 0.004-in (0.10-mm) diameter orifices spaced at 80/in (31.5/cm) and supplied at 1000 psi (6890 KPa).

Sample 6 was prepared in a manner similar to that used to prepare Sample 5, except that Screen S-2 (24 mesh) was used in the first hydraulic treatment step.

Sample D was prepared in a manner similar to Sample 6, except that Screen S-2 (24 mesh) was used in both hydraulic treatment steps.

Table III below, summarizes details of the hydraulic treatment conditions and the properties of the resulting samples.

As in the preceding examples, Samples 5 and 6 made in accordance with the invention, had their stitching holes substantially filled by fibers. However, Comparison Sample D, which in the final part of the hydraulic jet treatment was supported on a screen that was too coarse and not in accordance with the invention, did not have filled holes. Apparently, the relatively large protuberances of the coarser screen led to formation of additional holes during the jet treatment.

TABLE III

Example II
A. Hydraulic Jet Treatment

| Sample | 5 | 6 | D |
|---|---|---|---|
| Step 1 | | | |
| Screen mesh | 100 | 24 | 24 |
| Thickness ratio* | 2 | 8 | 8 |
| IxE, MJN/Kg | 0.040 | 0.040 | 0.040 |
| Step 2 | | | |
| Screen mesh | 100 | 100 | 24 |
| IxE, MJN/Kg | 0.035 | 0.035 | 0.035 |
| Total IxE, MJN/Kg | 0.075 | 0.075 | 0.075 |

B. Fabric Properties

| Sample | Initial± | 5 | 6 | D |
|---|---|---|---|---|
| Thickness, mm | 0.25 | 0.56 | 0.58 | 0.61 |
| Weight, g/m² | 54 | 54 | 54 | 54 |
| Bulk, cc/g | 4.6 | 10.4 | 10.7 | 11.3 |
| Frazier, m³/min | 22.9 | 23.7 | 0.45 | 0.88 |
| Filtration | | | | |
| (a) Hrs to clog | 22 | 85 | 84 | 31 |
| (b) Leakage, g/day | 8.2 | 0.8 | 0.8 | 3.7 |

+see Table I
*see Table I, (all samples of Example III used a 54-g/m² stitchbonded fabric of 0.15-mm initial compressed thickness)

EXAMPLE IV

In this example, a fabric suitable for use in high-temperature filtration, Sample 7, was prepared by hydraulic jet treatment of a stitchbonded fabric that was made with a highly-gathered, heavyweight, fire-resistant staple-fiber layer. Comparison Samples E and F were prepared using fine screens having a thickness in comparison to the initial compressed thickness of the stitchbonded fabric that was below the minimum required in the process of the present invention.

The starting stitchbonded fabric was obtained by stitching a 1.1 oz/yd² (37.3 g/m²) layer of Type Z-11 "Sontara" spunlaced fabric of "Kevlar" aramid staple fiber (made and sold by E. I. du Pont de Nemours and Co.) with a 280-den (311-dtex) "Lycra" spandex that was covered with 70-den (78-dtex) textured polyester yarn. The layer was stitchbonded with the stitching yarn on a one-bar "Liba" making 1,0-2,3 tricot stitches at 14 stitches/in (5.5/cm) and 12 gauge. The stitching thread was under sufficient tension and elongation so that upon release of the tension, the yarn contracted and the fabric gathered to a weight of 9.2 oz/yd² (311.9 g/m²). The stitchbonded fabric comprised approximately 44 wt% stitching yarn and had an initial compressed thickness of 0.028 in (0.71 mm).

Sample 7 was prepared by subjecting the stitchbonded fabric layer, in the first step of the hydraulic treatment, while supported on Screen S-3 (10 mesh), to an impact-energy of 0.42 MJN/Kg, by advancing the fabric in two passes under a row of columnar jets of water, spaced 40/in (15.7/cm), and emerging from orifices of 0.005-in (0.127-mm) diameter supplied with water at 1500 psi (10,340 KPa). The fabric was then subjected to an impact-energy of 0.08 MJN/Kg, while supported on Screen S-1 (100 mesh), by two passes under the same row of jets as in the first step, but with the orifices supplied with water at 1000 psi (6890 KPa).

Sample E was prepared by subjecting the initial stitchbonded fabric, in the first step of the hydraulic advancing the stitchbonded fabric in six passes under the jet treatment, to an impact-energy of 1.26 MJN/kg, while the fabric was supported on Screen S-1 (100 mesh), by row of jets specified for Sample 7, with the jets supplied at 1500 psi (10,340 KPa). (There was no second step.)

Sample F was prepared by subjecting the starting stitchbonded fabric, in the first part of the hydraulic jet treatment, to an impact-energy of 0.12 MJN/Kg, while the fabric was supported on Screen S-1 (100 mesh). In this first step of the treatment, three passes were made under a row of jets supplied from orifices of 0.010-in (0.25-mm) diameter, spaced at 10/in (3.9/cm) and supplied with water at 1000 psi (6890 KPa). Then in the second step of the treatment, the fabric was subjected to an impact energy of 0.21 MJN/Kg while supported on the same screen. In the second part of the treatment, six passes were made under a row of jets from orifices of 0.004-in (0.101 mm) diameter, spaced at 80/in (3.1/cm) and supplied with water at 1000 psi (6,890 KPa).

Table IV, below, summarizes details of the hydraulic treatment conditions and sample properties.

TABLE IV

Example IV
A. Hydraulic Jet Treatment

| Sample | 7 | E | F |
|---|---|---|---|
| Step 1 | | | |
| Screen mesh | 10 | 100 | 100 |
| Thickness Ratio* | 3.1 | 0.4 | 0.4 |
| IxE, MJ/Kg | 0.42 | 1.26 | 0.12 |
| Step 2 | | | |
| Screen mesh | 100 | ** | 100 |
| IxE, MJN/Kg | 0.08 | ** | 0.21 |
| Total IxE, MJN/Kg | 0.50 | 1.26 | 0.33 |

B. Fabric Properties

| Sample | Initial± | 7 | E | F |
|---|---|---|---|---|
| Thickness, mm | 2.06 | 2.11 | 2.03 | 2.18 |
| Weight, g/m² | 312 | 312 | 312 | 312 |
| Bulk, cm³/g | 6.6 | 6.8 | 6.5 | 7.0 |
| Frazier, m³/min | 6.77 | 2.78 | 1.73 | 4.1 |
| Filtration | | | | |
| (a) Hrs to clog | 74 | >180 | 70 | 79 |
| (b) Leakage, g/day | 0.20 | 0.02 | 0.13 | 0.14 |

±see table I
*see Table I, (all samples for Example IV used a 312-g/m² stitchbonded fabric of 0.71-mm initial compressed thickness)
**Total treatment in one step.

EXAMPLE V

In this example, stitchbonded fabric Samples 8 and 9 are treated with hydraulic jets in accordance with the invention to render the fabrics suitable for use in filter bags intended for environments of low-to-moderate temperatures. In contrast, Comparative Sample G, which was prepared with a screen in the first step of the treatment that was thinner than the initial compressed thickness of the stitchbonded fabric, had unacceptable filtration characteristics.

The starting stitchbonded fabric was obtained by stitching two superimposed layers of 2-oz/yd² (67.8 g/m²) Style 505 "Reemay" unbonded continuous filament polyester fabric (manufactured by Reemay, Inc., Nashville, TN) with a 150-den (167-dtex), 34-end textured polyester yarn supplied to two bars of a "Liba" stitchbonding machine threaded at 12 gauge (12 needles per 2.54 cm). The first bar stitched 1-0,0-1 chain stitches at 21 stitches/in (8.3/cm) and the second bar stitched 1-0,2-3 tricot stitches at 21 stitches/in (8.3/cm). The stitching of the stitchbonded fabric amounted to about 33% of the weight of the fabric. The total weight of the stitchbonded fabric was 6.6 oz/yd² (224 g/m²) and the initial compressed thickness of the fabric was 0.033 in (0.84 mm).

Sample 8 was subjected to the hydraulic jet treatment as follows. In the first step of the treatment, the stitchbonded fabric was supported on Screen S-2 (24 mesh) and passed three times under row of columnar jets of water, spaced at 40/in (15.7/cm), and emerging form orifices of 0.005-in (0.127-mm) diameter supplied with water at 1500 psi (10,340 KPa)., the jets thereby imparting an impact-energy of 0.63 MJN/Kg. The fabric was then subjected in the second part of the hydraulic jet treatment to an impact energy of 0.54 MJ-N/kg, while being supported on Screen S-1 (100 mesh) and being passed three times under a row of jets supplied at 1500 psi (10,340 KPa) from orifices of 0.004-in (101-mm) diameter, spaced at 80/in (31.5/cm).

Sample 9 was prepared similarly by subjecting the stitchbonded fabric to an impact-energy of. 0.21 MNJ/Kg in the first step of the treatment while supported on Screen S-3 (10 mesh) and being passed once under a row of jets supplied with water at 1500 psi (10,340 KPa) through orifices of 0.005-in (0.127-mm) diameter, spaced at 40/in (15.7/cm). The truly treated stitchbonded fabric was then subjected in a second step to an impact-energy of 0.18 MJN/Kg, while supported on Screen S-1 (100 mesh) by passage under jets supplied at 1500 psi (10,340 KPa), through orifices of 0.004-in (101-mm) diameter spaced at 80/in (31.5/cm).

Sample G was prepared by subjecting the starting stitchbonded fabric in a first step to an impact-energy of 1.25 MJK/Kg while supported on Screen S-1 (100 mesh) by passing the fabric fibe times a row of jets supplied with water at 1500 psi (10,340 KPa) through orifices of 0.010-in diameter spaced at 10/in (3.9/cm). The thusly treated fabric was then subjected to an impact energy of 0.9 MJ-N/kg, while supported on the same screen, using five passes under a row of jets supplied with water at 1500 psi (10,340 KPa) through orifices of 0.004-in (0.101-mm) diameter spaced at 80/in (31.5/cm).

Table V, below, summarizes details of the hydraulic treatment conditions and sample properties.

TABLE V

Example V
A. Hydraulic Jet Treatment

| Sample | 8 | 9 | G |
|---|---|---|---|
| Step 1 | | | |
| Screen mesh | 24 | 10 | 100 |
| Thickness Ratio* | 1.4 | 2.6 | 0.4 |
| IxE, MJ/Kg | 0.63 | 0.21 | 1.25 |
| Step 2 | | | |
| Screen mesh | 100 | 100 | 100 |
| IxE, MJN/Kg | 0.54 | 0.18 | 0.90 |
| Total IxE, MJN/Kg | 1.17 | 0.39 | 2.15 |

B. Fabric Properties

| Sample | Initial± | 8 | 9 | G |
|---|---|---|---|---|
| Thickness, mm | 1.73 | 1.85 | 1.91 | 2.06 |
| Weight, g/m² | 221 | 221 | 221 | 221 |

TABLE V-continued

| Bulk, cm³/g | 7.8 | 8.4 | 8.6 | 9.3 |
|---|---|---|---|---|
| Frazier, m3/min | 2.78 | 1.76 | 1.44 | 2.66 |
| Filtration | | | | |
| (a) Hrs to clog | 35 | >180 | >180 | 78 |
| (b) Leakage, g/day | 0.73 | 0.07 | 0.03 | 0.70 |

+see table 1
*see Table I, (all samples for Example V used a 224-g/m² fabric of 0.84 mm initial compressed thickness)

I claim:

1. A process wherein a stitchbonded fabric comprising a multi-needle stitched fibrous layer of substantially nonbonded fibers is subjected to a treatment wherein the stitchbonded fabric, while supported on a screen, is impacted by columnar jets of water, the stitchbonded fabric having initial compressed thickness in the range of 0.15 to 0.85 mm and a unit weight in the range of 50 to 350 g/m², the jets imparting to the stitchbonded fabric a total impact-energy of at least 0.03 MJN/Kg, at least 0.02 MJN/Kg of the total impact-energy being imparted in a final part of the treatment with the stitchbonded fabric supported on a screen of no coarser than 40 mesh, and with the jets in the final part of the treatment being supplied through orifices of no greater than 0.15-mm diameter and being spaced with a frequency of at least 10/cm across the fabric, and the screen in the first part of the treatment having a thickness at least equal to the initial compressed thickness of the stitchbonded fabric.

2. A process in accordance with claim 1 wherein the total impact-energy is no greater than 1.2 MJN/Kg and the supporting screen in the final part of the treatment has a mesh in the range of 100 to 200 and an open area in the range of 20 to 25%, and the jets are spaced with a frequency of at least 15/cm across the fabric.

3. A process in accordance with claim 1 or 2 wherein the supporting screen in the first portion of the treatment has a thickness of 1.5 to 10 times the initial compressed thickness of the stitchbonded fabric and the total impact-energy is no greater than 1.3 MJN/Kg.

4. A process in accordance with claim 1 or 2, wherein the stitchbonded fabric is lightweight having an initial compressed thickness of no greater than 0.7 mm and weighing no more than 150 g/m², and the total impact-energy is no more than 0.1 MJN/Kg.

5. A process in accordance with claim 4, wherein the stitchbonded fabric has an initial compressed thickness of no greater than 0.25 mm and a weight of no more than 100 g/m², and the entire hydraulic jet treatment is performed with the stitchbonded fabric supported on the fine-mesh screen.

6. A hydraulic-jet-treated stitchbonded fabric comprising a multineedle stitched layer of substantially nonbonded fibers, the fabric having a unit weight in the range of 50 to 350 g/m², a Frazier air permeability of at least 0.3 m³/min, a bulk of at least 6 cm³/gram and a dust filtration leakage of no greater than 0.3 gram per day.

7. A fabric in accordance with claim 6 wherein the unit weight is at least 100 g/m² and the dust filtration leakage is less than 0.1 g/day.

* * * * *